(12) United States Patent
Fay et al.

(10) Patent No.: US 7,536,600 B2
(45) Date of Patent: May 19, 2009

(54) METHODS AND APPARATUS FOR ELIMINATING LOWER VALUE TESTS FOR A UNIT UNDER TEST, AND FOR DEVELOPING A PLURALITY OF DIFFERENT AND SYNCHRONIZED TEST EXECUTION ORDERS FOR TESTING A PLURALITY OF UNITS UNDER TEST

(75) Inventors: Thomas R. Fay, Fort Collins, CO (US); William H. Wubbena, Fort Collins, CO (US); Carl E. Benvenga, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 425 days.

(21) Appl. No.: 11/442,430

(22) Filed: May 26, 2006

(65) Prior Publication Data

US 2007/0294579 A1    Dec. 20, 2007

(51) Int. Cl.
   *G06F 11/00* (2006.01)
(52) U.S. Cl. ...................................................... 714/37
(58) Field of Classification Search .................. 714/27, 714/31, 32, 36–38, 43, 46
   See application file for complete search history.

(56) References Cited

U.S. PATENT DOCUMENTS 5,307,290 A * 4/1994 Raviglione et al. ............ 701/29
5,805,795 A * 9/1998 Whitten ......................... 714/38
6,697,750 B1 * 2/2004 Coin et al. .................... 702/108
6,895,565 B2   5/2005 Parker
6,948,140 B2   9/2005 Parker et al.
7,142,960 B2 * 11/2006 Grier et al. ..................... 701/29
7,165,074 B2 * 1/2007 Avvari et al. ................. 707/102

OTHER PUBLICATIONS

Tom Fay, "Testing Multiple UUT's at Once on Functional Test Systems", Application Note 1470, Agilent Technologies, Inc., pp. 1-8 (Feb. 11, 2004).
"TS-5400 Series II: Automotive Electronics Functional Test System", Product Note, Agilent Technologies, Inc., pp. 1-16 (May 2000).
James Grey, "Parallel Testing and TestStand 2.0", National Instruments, pp. 1-47 (2001).

* cited by examiner

*Primary Examiner*—Nadeem Iqbal

(57) ABSTRACT

In one embodiment, test execution times are determined for a plurality of tests that are to be executed for a single unit under test (UUT). Test dependencies are also determined for the tests, as are the instruments needed to execute the tests. Then, in response to the test execution times, the test dependencies, and the instruments needed to execute the plurality of tests, a plurality of different and synchronized test execution orders for the plurality of tests are developed. Each of the test execution orders specifies a sequence of tests that is to be executed for one of a plurality of UUTs that are to be tested in parallel; and, typically, the plurality of different test execution orders will be constrained to develop different test execution orders that optimize a total time to test the plurality of UUTs, a usage cost of instruments used to test the plurality of UUTs, or both. Other embodiments are also disclosed.

15 Claims, 5 Drawing Sheets

US 7,536,600 B2

METHODS AND APPARATUS FOR ELIMINATING LOWER VALUE TESTS FOR A UNIT UNDER TEST, AND FOR DEVELOPING A PLURALITY OF DIFFERENT AND SYNCHRONIZED TEST EXECUTION ORDERS FOR TESTING A PLURALITY OF UNITS UNDER TEST

BACKGROUND

Testing a plurality of units under test (UUTs) can be time-intensive and costly, with time being a factor that often increases cost. As a result, it is typically desirable to test a plurality of UUTs in as little time as possible.

One way to decrease the amount of time that is needed to test a plurality of UUTs is to test two or more UUTs in parallel, using two or more test instruments (or testers). However, if a UUT is to be subjected to a plurality of tests, and some (or all) of the test instruments used to test the UUTs are capable of executing only specific tests, then an attempt to execute a series of tests in parallel, for multiple UUTs, can result in significant periods of instrument downtime.

SUMMARY OF THE INVENTION

In one embodiment, a method comprises 1) determining test execution times for a plurality of tests that are to be executed for a single UUT; 2) determining test dependencies for the plurality of tests; 3) determining what instruments are needed to execute the plurality of tests; and 4) developing, in response to the test execution times, the test dependencies, and the instruments needed to execute the plurality of tests, a plurality of different and synchronized test execution orders for the plurality of tests, wherein each of the test execution orders specifies a sequence of tests that is to be executed for one of a plurality of UUTs that are to be tested in parallel.

In another embodiment, apparatus comprises computer-readable code stored on computer-readable media. The code comprises 1) code to determine test execution times for a plurality of tests that are to be executed for a single UUT; 2) code to determine test dependencies for the plurality of tests; 3) code to determine what instruments are needed to execute the plurality of tests; and 4) code to, in response to the test execution times, the test dependencies, and the instruments needed to execute the plurality of tests, develop a plurality of different and synchronized test execution orders for the plurality of tests. Each of the test execution orders specifies a sequence of tests that is to be executed for one of a plurality of UUTs that are to be tested in parallel; and, typically, the plurality of different test execution orders will be constrained to develop different test execution orders that optimize a total time to test the plurality of UUTs, a usage cost of instruments used to test the plurality of UUTs, or both.

In yet another embodiment, a method comprises 1) in response to a model of which UUT faults are tested by which of a plurality of tests for a UUT, and by how much, assigning scores to the plurality of tests, the scores being assigned at least partly based on unique fault coverages of the tests; and 2) in response to a desired fault coverage, identifying at least one test with a lower score for elimination from the plurality of tests, wherein elimination of the at least one test with a lower score enables the desired fault coverage to be maintained.

In still another embodiment, apparatus comprises computer-readable code stored on computer-readable media. The code comprises 1) code to, in response to a model of which UUT faults are tested by which of a plurality of tests for a UUT, and by how much, assign scores to the plurality of tests, the scores being assigned at least partly based on unique fault coverages of the tests; and 2) code to, in response to a desired fault coverage, identify at least one test with a lower score for elimination from the plurality of tests, wherein elimination of the at least one test with a lower score enables the desired fault coverage to be maintained.

In another embodiment, apparatus comprises computer-readable code stored on computer-readable media, with the code comprising code to, during execution of a sequence of tests on an instrument used to test a plurality of UUTs, track a current test setup state of the instrument and, upon processing an instruction to execute a next test setup for the instrument, 1) determine if the next test setup is already reflected in the current test setup state of the instrument, and 2) if the next test setup is reflected in the current test setup state, dynamically suppress the next test setup so as to mitigate duplicative performance of test setups for the instrument.

Other embodiments are also disclosed.

BRIEF DESCRIPTION OF THE DRAWINGS

Illustrative embodiments of the invention are illustrated in the drawings, in which.

DETAILED DESCRIPTION

Figure 1:
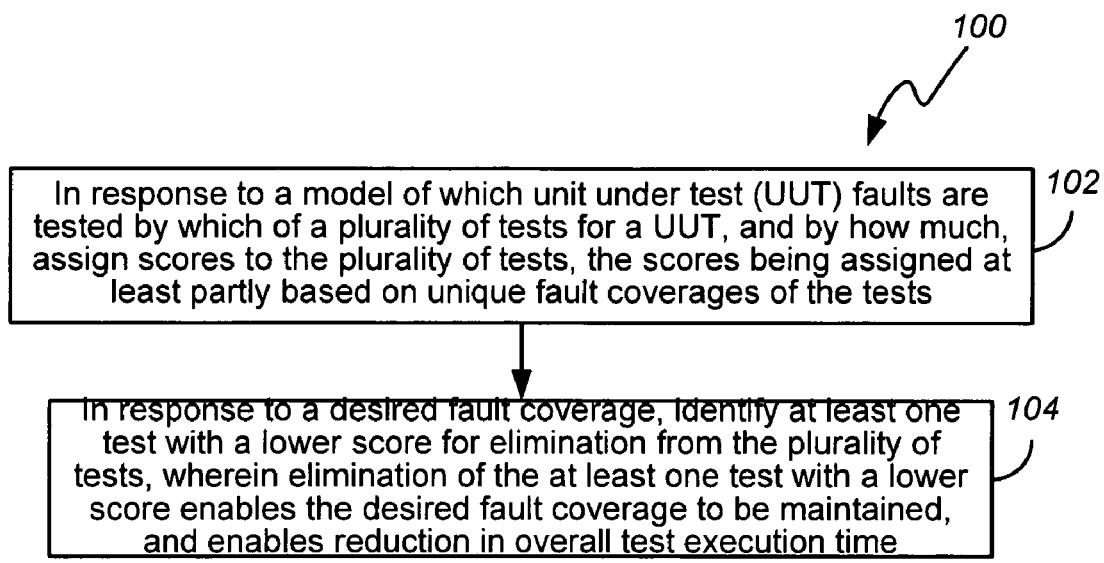
FIG. 1 illustrates an exemplary method for eliminating lower value tests for a UUT.
Figure 2:
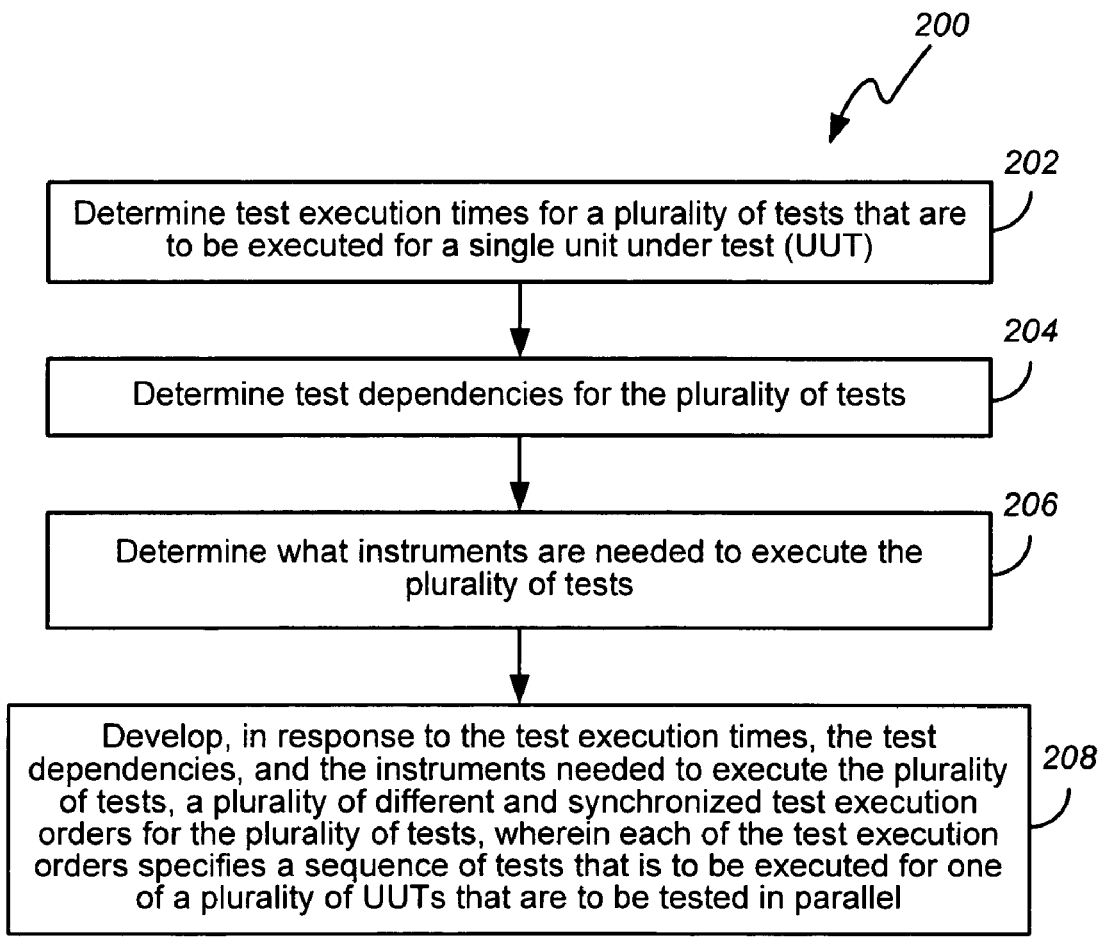
FIG. 2 illustrates an exemplary method to develop a plurality of different and synchronized test execution orders for testing a plurality of UUTs in parallel.

The methods and apparatus disclosed herein assume that a user has already developed a plurality of tests for a UUT. Given the plurality of tests, FIG. 1 illustrates an exemplary method 100 for identifying lower value ones of the tests for elimination, and FIG. 2 illustrates an exemplary method 200 for developing a plurality of different and synchronized test execution orders for the tests. Although either of the methods 100, 200 may be executed in isolation, it is contemplated that the methods 100, 200 are best employed by first executing the method 100, and then executing the method 200 for the tests that remain after executing the method 100.

Turning now to FIG. 1, there is shown an exemplary method 100 wherein, in response to a model of which UUT faults are tested by which of a plurality of UUT tests, and by how much, scores are assigned to the plurality of tests. See, FIG. 1, block 102. The scores are assigned at least partly based on unique fault coverages of the tests, but may also be assigned based on other factors. Unique fault coverage may take into account considerations such as 1) the number of other tests that test for the same fault, and 2) the relative strengths of tests that test for the same fault. "Faults" may include both isolated, single-component faults, as well as multiple-component faults.

After the scores have been assigned, and in response to a desired fault coverage, one or more tests with lower scores may be identified for elimination from the plurality of tests (at block 104). The test(s) are identified such that their elimination would enable the desired fault coverage to be maintained. If two or more tests are eligible for elimination, but maintenance of the desired fault coverage allows only a subset of the tests to be eliminated, then one or more tests having longer execution times are preferably identified for elimination.

The model of which UUT faults are tested by which tests, and by how much, may be developed in various ways. In one embodiment, the model may be developed manually. In other embodiments, the model may be developed automatically, based on, for example 1) the results of one or more simulated executions of the tests, or 2) historical test results based on an actual execution (or executions) of the plurality of tests. If the model is based on simulated test executions, the model may be developed, at least in part, using the "Fault Detective" software package and underlying technologies offered by Agilent Technologies, Inc.

In one embodiment, the test(s) that are identified to be eliminated are automatically eliminated without user intervention. In another embodiment, the test(s) are displayed to a user for confirmation that they should be eliminated. The test(s) may be displayed, for example, by means of a graphical user interface (GUI). Preferably, the tests are displayed along with their test execution times, so that a user may consider this when choosing which of the tests to eliminate. Alternately (or additionally), the tests could be displayed in a tabular order that indicates their relative execution times. Tests that have not been identified for elimination may also be displayed via the GUI. In some cases, a user's selection of particular combinations of tests for elimination may result in 1) the update of a resultant test coverage, or 2) the triggering of an alert that the desired fault coverage cannot be maintained. The same or different GUI may also be used to prompt a user for a desired test coverage.

Note that an "eliminated" test may be eliminated for part or all of a test process. For example, the method 100 may be used to condense the number of tests that are run on each of a plurality of UUTs during an initial test process. Tests that were "eliminated" from the initial test process may then be applied to failing ones of the UUTs during a diagnostic or repair process.

The method 100 may be implemented by means of computer-readable code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable code will typically comprise software, but could also comprise firmware or a programmed circuit.

After condensing a plurality of tests for a single UUT using the method 100, the remaining tests may be processed in accord with the method 200 (FIG. 2) to develop a plurality of different and synchronized test execution orders for testing a plurality of UUTs in parallel. Alternately, a plurality of tests may be processed by the method 200 in the absence of pre-processing the tests using the method 100.

In accord with the method 200, test execution times are determined for a plurality of tests that are to be executed for a single UUT. See, FIG. 2, block 202. Test dependencies among the tests, as well as the type of instruments that are needed to execute the plurality of tests, are also determined (at blocks 204 and 206). Then, in response to the test execution times, the test dependencies, and the instruments needed to execute the plurality of tests, a plurality of different and synchronized test execution orders are developed for the plurality of tests (at block 208). Each of the test execution orders specifies a sequence of tests that is to be executed for one of a plurality of UUTs that are to be tested in parallel.

Preferably, development of the plurality of different test execution orders is constrained to develop different test execution orders that optimize a total time to test the plurality of UUTs. However, in some cases, other factors may be taken into account. For example, the development of different test execution orders may be constrained to develop different test execution orders that optimize a balance between 1) a total time to test the plurality of UUTs, and 2) a usage cost of instruments used to test the plurality of UUTs.

In one embodiment, the method 200 may comprise determining how many of each instrument are available to execute a UUT's plurality of tests. The plurality of different test execution orders can then be developed in response to a number of each instrument that is available to execute the plurality of tests. In another embodiment, execution of the method 200 may result in the display of a user interface (e.g., a dialog box) via which a user may specify a number of each kind of test instrument that are to be used to test the plurality of UUTs. The specified numbers of each kind of test instrument may then be used as a constraint in developing the plurality of different test execution orders.

In yet another embodiment, the method 200 may be configured to develop different sets of test execution orders, with different ones of the sets 1) requiring different numbers of instruments to execute the tests of the set, and 2) providing different total times to test the plurality of UUTs. Information regarding the different sets of test execution orders may then be displayed via a user interface, so that a user can select one of the sets for execution.

When developing different sets of test execution orders, the sets may be developed in the context of instruments that are currently available in a user's test environment (including or excluding instruments that are currently in use). Alternately, some or all of the sets may require more instruments than are currently available in a user's test environment. In this latter case, a user could then decide if a proposed reduction in test time was worth the cost of acquiring (e.g., purchasing or leasing) another test instrument (or instruments).

Figure 3:
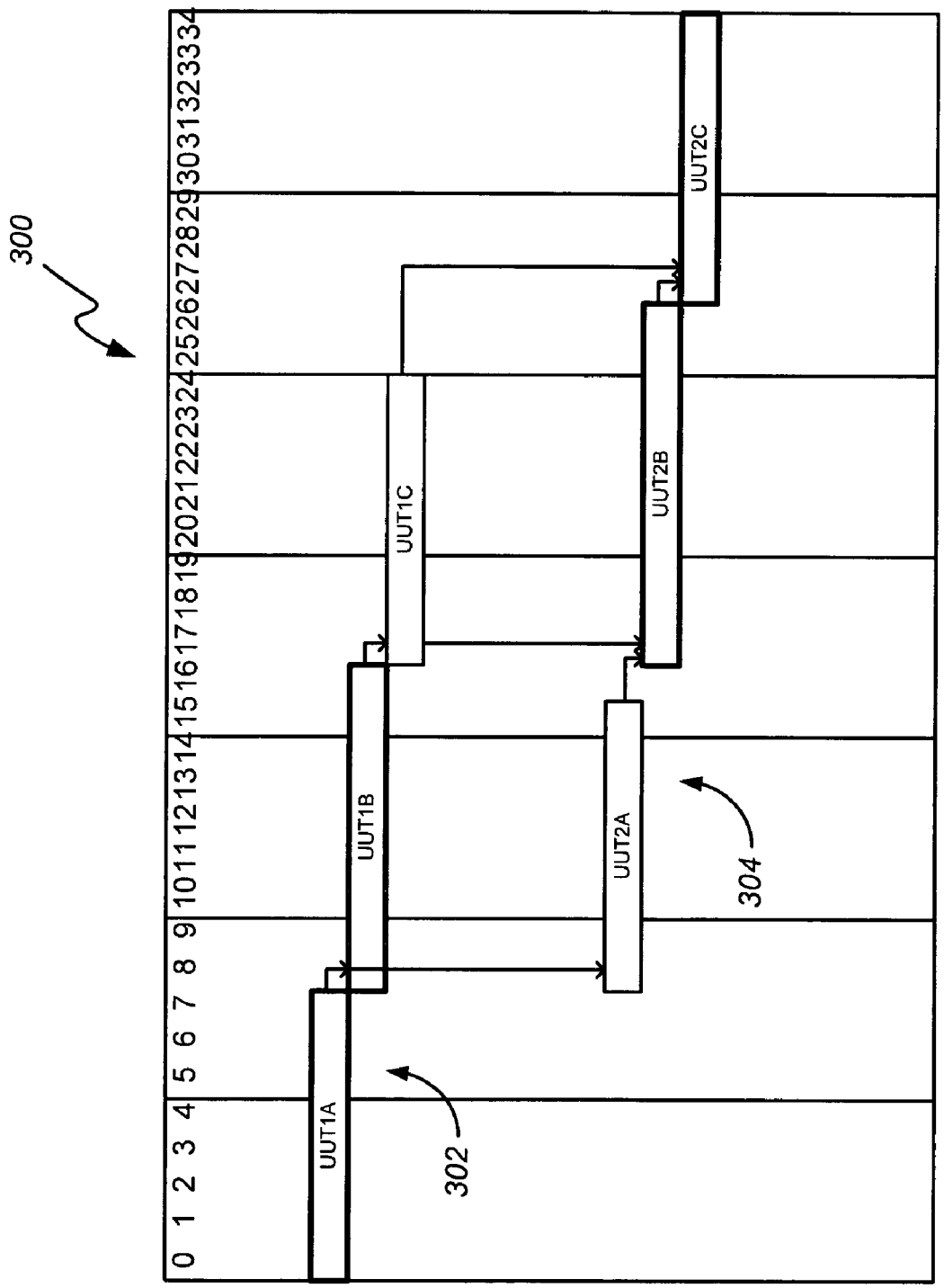
FIGS. 3 & 4 illustrate an exemplary user interface that may be displayed as a result of execution of the method shown in FIG. 2.

FIG. 3 shows an exemplary user interface 300 that may be displayed before, during or after execution of the method 200. As shown, the user interface 300 may display the test execution order 302, 304 for each of a plurality of UUTs, such as UUT1 and UUT2. The test execution orders 302, 304 are preferably displayed in a synchronized format, with each test execution order 302, 304 being displayed as a sequence of linked elements, with at least some of the elements (e.g, UUT1A) representing one or more tests, and with each of the elements graphically indicating a time to complete one or more actions that are represented by the element. In one embodiment, the linked elements may comprise linked bars that are shown in a project schedule type of graph. However, the linked elements could also take other forms, such as linked objects of other kinds, or a tabular form indicating relationships between tests, UUTs and time. In FIG. 3, the lengths of the bars are indicative of the times required to complete respective actions.

Gaps between linked elements displayed by the user interface 300 indicate inefficiencies in test execution order. As described above, the method 200 is preferably constrained to minimize the total time needed to execute a plurality of tests on a plurality of UUTs. Assuming that tests may be executed on two independently operable instruments, executing the method 200 on the test execution orders 302, 304 shown in FIG. 3 might therefore yield the optimized test execution orders 402, 404 shown in FIG. 4. In such a case, the gaps between the linked elements (in FIG. 4) represent optimized instrument wait times. Note that the test execution orders 302, 304 shown in FIG. 3, both of which take the order A-B-C, may be optimized to yield the test execution orders 402, 404 shown in FIG. 4. The test execution order 402 takes the order A-C-B, and the test execution order 404 takes the order B-A-C.

Figure 4:
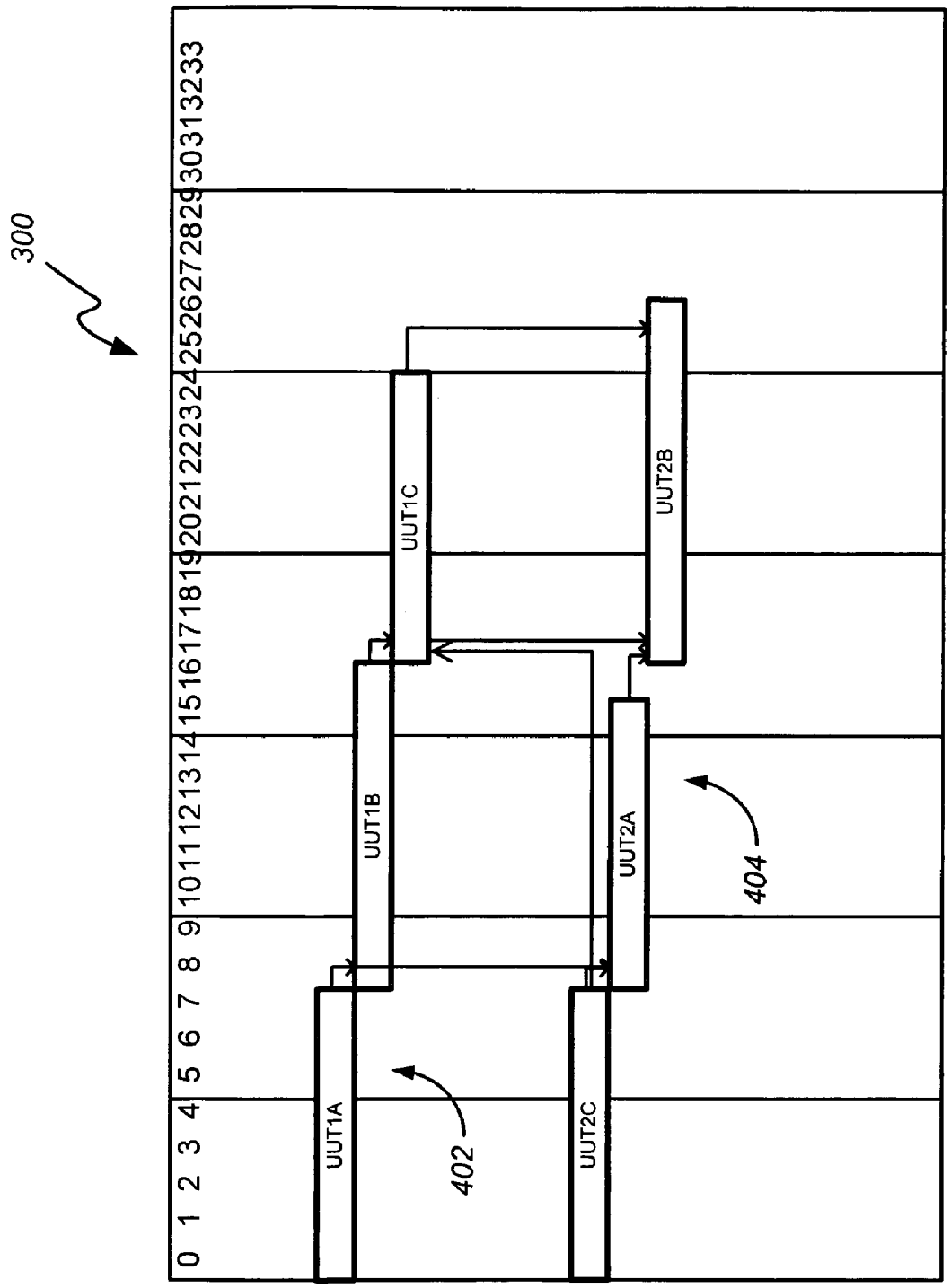

The bolded elements in FIGS. 3 & 4 represent the elements forming a "critical time path".

In one embodiment, at least some of the linked elements are selectable and movable by a user (e.g., via a graphical "drag and drop" operation). In this manner, a user may generate their own set of test execution orders, or may customize (or override) the test execution orders that are automatically generated by a computer system. When a user selects and moves one or more of the linked elements, the plurality of test execution orders may be updated, and the displayed sequences of linked elements may be modified, as necessary, to comply with: the test execution times, the test dependencies (designated by the arrowed lines that connect the elements shown in FIGS. 3 & 4), the instruments needed to execute the plurality of tests, a number of instruments available to execute the plurality of tests, and the user's desired placement of the selected and moved one(s) of the linked elements. One or more test execution orders may be updated, for example, by 1) simply bumping certain tests to "make way" for the moved test or tests, or 2) re-optimizing the execution order of one or more test sequences.

In FIGS. 3 & 4, test setup times, if any, may be presumed to be included in the test times (e.g., UUT1a). However, in one embodiment, the method 200 may further comprise determining test setup times for a plurality of tests. A plurality of different test execution orders may then also be developed in response to the test setup times. For example, the development of the plurality of different test execution orders may be constrained to yield test execution orders that mitigate duplicative performance of test setups for at least one of the instruments that is used to test the plurality of UUTs. In addition, test execution orders may sometimes be developed such that test setup times are overlapped.

Figure 5:
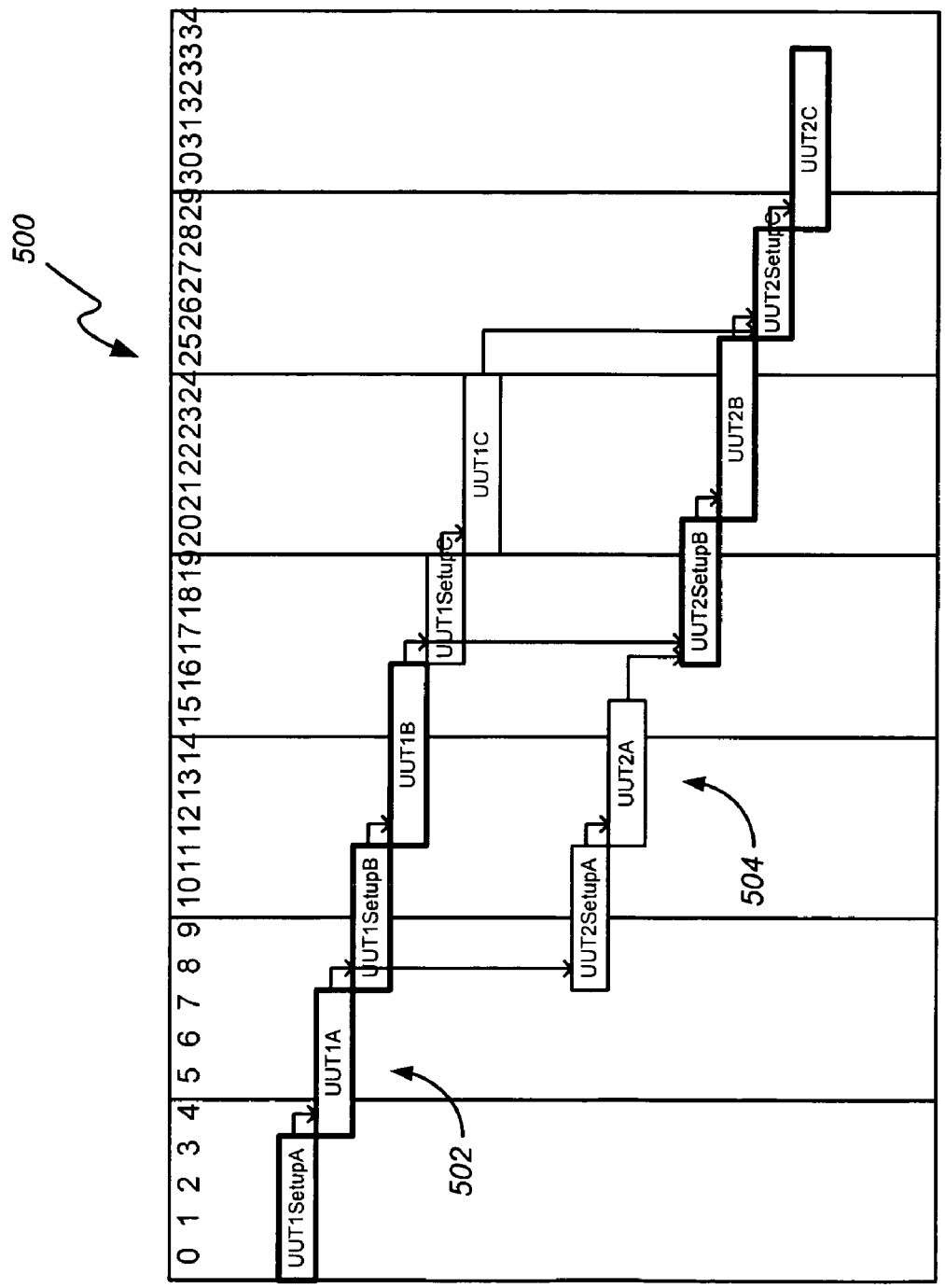
FIGS. 5 & 6 illustrate an alternate embodiment of the user interface shown in FIGS. 3 & 4, wherein test setup times are displayed in addition to test times.
Figure 6:
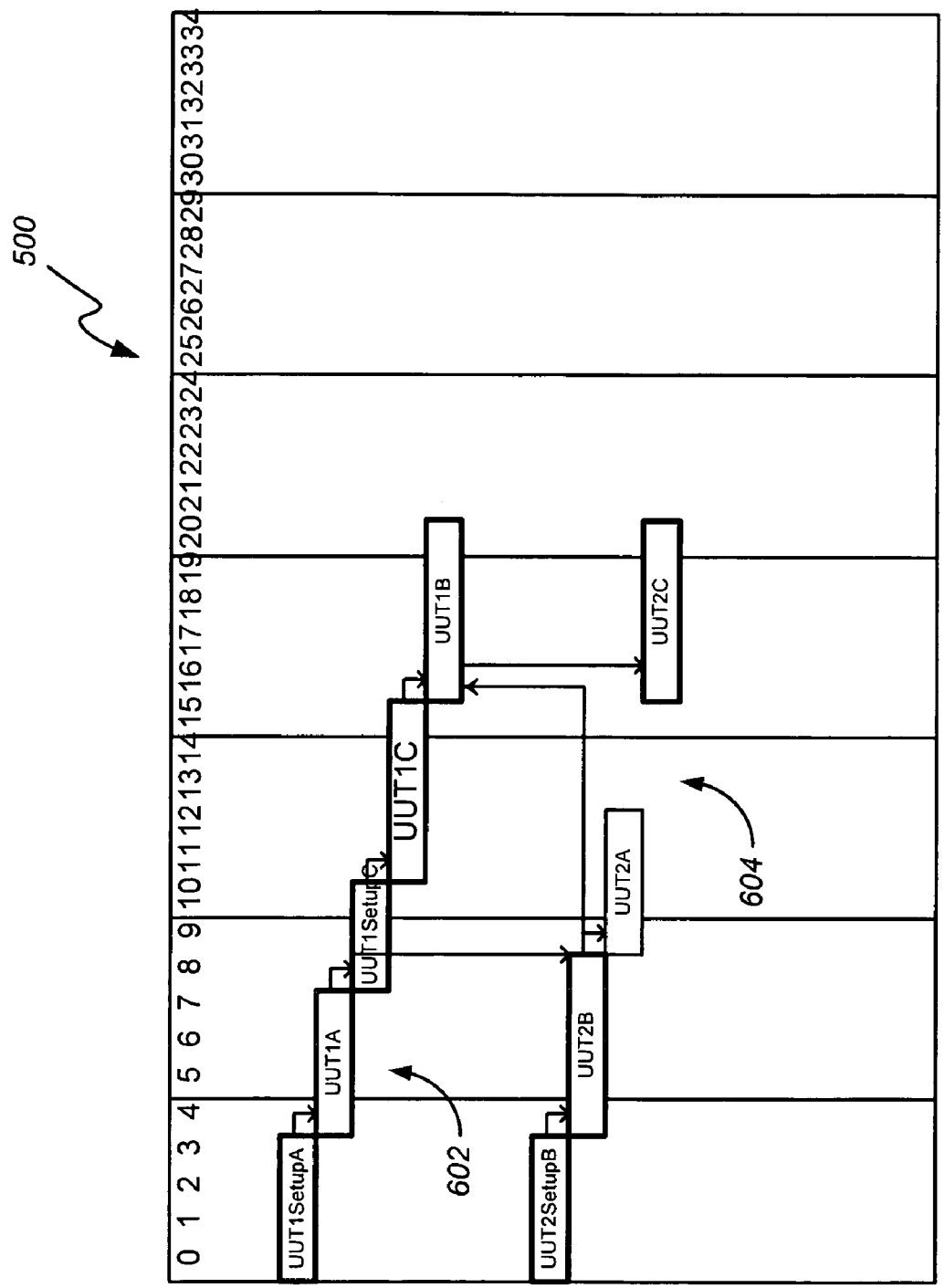

FIGS. 5 & 6 illustrate an alternate embodiment 500 of the user interface shown in FIGS. 3 & 4. The user interface 500 is similar to the user interface 300 in that it displays the test execution orders 502, 504 for each of a plurality of UUTs in a synchronized format (with each test execution order being displayed as a sequence of linked elements, with each of the elements graphically indicating a time to complete one or more actions that are represented by the element, and with at least some of the elements representing one or more tests). However, in addition, at least some of the elements (e.g., UUT1 SetupA) represent test setups that correspond to the tests (e.g., UUT1A).

FIG. 5 illustrates test execution orders 502, 504 as they might exist prior to execution of the method 200 (FIG. 2); and FIG. 6 illustrates test execution orders 602, 604 as they might exist subsequent to execution of the method 200. Note that, by re-ordering both the tests and test setups, duplicate test setups may be eliminated.

Although the user interface 500 shown in FIGS. 5 & 6 appears to separate "test setups" from their corresponding "tests", in reality, test setups are usually embedded in (or integrally tied to) the instructions for executing their corresponding tests. As a result, skipping or aborting a test can result in skipped or aborted test setups. Thus, when executing a plurality of different test execution orders that have been optimized to mitigate duplicative performance of test setups, it may be necessary to "dynamically suppress" certain test setups during execution of a sequence of tests. In one embodiment, this is done by tracking a current test setup state for each of the instruments that is used to test a plurality of UUTs. Upon processing an instruction to execute a next test setup for an instrument, it is then determined if the next test setup is already reflected in the current test setup state of the instrument. If it is, the next test setup is dynamically suppressed, thereby mitigating unnecessary duplication of the test setup for the instrument. If the next test setup is not reflected in the current test setup state, the next test setup is executed. In this manner, even though a sequence of tests has been optimized to mitigate the duplicate performance of test setups, the default performance is to execute a test setup unless it can be determined that the current test setup state of an instrument already reflects the test setup.

Referring again to FIG. 5, it is noted that when a user selects and moves one or more of the linked elements displayed via the interface 500, the plurality of test execution orders 502, 504 may be updated, and the displayed sequences of linked elements may be modified, as necessary, to comply with: the test execution times and dependencies, the test setup times and dependencies, the instruments needed to execute the plurality of tests, a number of instruments available to execute the plurality of tests, and the user's desired placement of the selected and moved one(s) of the linked elements.

Similarly to the method 100, the method 200 may be implemented by means of computer-readable code stored on computer-readable media.

By implementing both of the methods disclosed herein, a user may optimize the test scope (i.e., number of tests performed on a UUT), test time, and test resources (e.g., test instruments) that are used to test a plurality of UUTs in parallel.

What is claimed is:

1. Apparatus, comprising:
computer-readable media; and
computer-readable code stored on the computer-readable media, comprising:
 code to determine test execution times for a plurality of tests that are to be executed for a single unit under test (UUT);
 code to determine test dependencies for the plurality of tests;
 code to determine which of one or more instruments are needed to execute the plurality of tests; and
 code to, in response to the test execution times, the test dependencies, and the instruments needed to execute the plurality of tests, develop a plurality of different and synchronized test execution orders for the plurality of tests, wherein each of the test execution orders specifies a sequence of tests for one of a plurality of parallel-tested UUTs.

2. The apparatus of claim 1, wherein the code to develop the plurality of different test execution orders is at least one of:
 constrained to develop different test execution orders that optimize a total time to test the plurality of UUTs;
 configured to develop different sets of test execution orders, with different ones of the sets i) requiring different numbers of instruments to execute the tests of the set, and ii) providing different total times to test the plurality of UUTs; the apparatus further comprising code to display a user interface that allows a user to select one of the sets for execution; and
 constrained to develop different test execution orders that optimize a balance between i) a total time to test the plurality of UUTs, and ii) a usage cost of instruments used to test the plurality of UUTs.

3. The apparatus of claim 1, further comprising at least one of:
- code to determine how many of each of the one or more instruments are available to execute the plurality of tests; wherein the code to develop the plurality of different test execution orders further develops the plurality of different test execution orders in response to a number of each instrument that is available to execute the plurality of tests; and
- code to determine test setup times for the plurality of tests; wherein the code to develop the plurality of different test execution orders further develops the plurality of different test execution orders in response to the test setup times.

4. The apparatus of claim 3, wherein the code to develop the plurality of different test execution orders is constrained to develop different test execution orders that mitigate duplicative performance of test setups for at least one instrument that is used to test the plurality of UUTs.

5. The apparatus of claim 3, further comprising:
- code to, during execution of a sequence of tests on one of the instruments used to test the plurality of UUTs, track a current test setup state of the instrument and, upon processing an instruction to execute a next test setup for the instrument, 1) determine if the next test setup is already reflected in the current test setup state of the instrument, and 2) if the next test setup is reflected in the current test setup state, dynamically suppress the next test setup so as to mitigate duplicative performance of test setups for the instrument.

6. The apparatus of claim 1, wherein:
- the code to develop the plurality of different test execution orders is configured to display a user interface; and
- the user interface displays the test execution order for each of the plurality of UUTs in a synchronized format, with each test execution order being displayed as a sequence of linked elements, with at least some of the elements representing one or more tests, and with each of the elements graphically indicating a time to complete one or more actions that are represented by the element.

7. The apparatus of claim 6, wherein the linked elements comprise linked bars.

8. The apparatus of claim 6, wherein at least some of the linked elements are selectable and movable by a user.

9. The apparatus of claim 8, further comprising:
code to, in response to user selection and movement of one or more of the linked elements, update the plurality of test execution orders and modify the displayed sequences of linked elements, as necessary, to comply with: the test execution times, the test dependencies, the instruments needed to execute the plurality of tests, a number of instruments available to execute the plurality of tests, and the user's desired placement of the selected and moved one(s) of the linked elements.

10. The apparatus of claim 1, wherein:
- the code to develop the plurality of different test execution orders is configured to display a user interface;
- the user interface enables a user to specify a number of each kind of test instrument that are to be used to test the plurality of UUTs; and
- the number of each kind of test instrument specified by the user is used as a constraint by the code to develop the plurality of different test execution orders.

11. The apparatus of claim 1, further comprising:
code to, prior to developing the plurality of test execution orders, and in response to a model of which UUT faults are tested by which of the plurality of tests, and by how much, assign scores to the plurality of tests, the scores being assigned at least partly based on unique fault coverages of the tests; and
code to, prior to developing the plurality of test execution orders, and in response to a desired fault coverage, identify at least one test with a lower score for elimination from the plurality of tests, wherein elimination of the at least one test with a lower score enables the desired fault coverage to be maintained.

12. The apparatus of claim 11, further comprising at least one of:
- code to select, from the at least one test with a lower score, one or more tests with longer execution times for elimination; and
- code to display the at least one test with a lower score to a user, for confirmation that the at least one test should be eliminated.

13. The apparatus of claim 11, further comprising at least one of:
- code to access results of a simulated execution of the plurality of tests for the single UUT, to develop the model of which UUT faults are tested by which tests; and
- code to access historical test results based on execution of the plurality of tests for the single UUT, to develop the model of which UUT faults are tested by which tests.

14. A method, comprising:
- determining test execution times for a plurality of tests that are to be executed for a single unit under test (UUT);
- determining test dependencies for the plurality of tests;
- determining what instruments are needed to execute the plurality of tests; and
- developing, in response to the test execution times, the test dependencies, and the instruments needed to execute the plurality of tests, a plurality of different and synchronized test execution orders for the plurality of tests, wherein each of the test execution orders specifies a sequence of tests that is to be executed for one of a plurality of UUTs that are to be tested in parallel.

15. The method of claim 14, further comprising at least one of:
- determining how many of each instrument are available to execute the plurality of tests; wherein the plurality of different test execution orders are further developed in response to a number of each instrument that is available to execute the plurality of tests; and
- determining test setup times for the plurality of tests; wherein 1) the plurality of different test execution orders are further developed in response to the test setup times, and 2) development of the plurality of different test execution orders is constrained to mitigate duplicative performance of test setups for at least one instrument that is used to test the plurality of UUTs; and
- during execution of a sequence of tests on one of the instruments used to test the plurality of UUTs, tracking a current test setup state of the instrument and, upon processing an instruction to execute a next test setup for the instrument, 1) determining if the next test setup is already reflected in the current test setup state of the instrument, and 2) if the next test setup is reflected in the current test setup state, dynamically suppressing the next test setup so as to mitigate duplicative performance of test setups for the instrument.

* * * * *